(12) United States Patent
Studeny et al.

(10) Patent No.: US 11,001,197 B2
(45) Date of Patent: May 11, 2021

(54) INDIVIDUALIZABLE LIGHTING SYSTEM FOR A VEHICLE

(71) Applicant: VOLKSWAGEN AKTIENGESELLSCHAFT, Wolfsburg (DE)

(72) Inventors: Christian Studeny, Braunschweig (DE); Nils Pfullmann, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/616,759

(22) PCT Filed: Apr. 23, 2018

(86) PCT No.: PCT/EP2018/060276
§ 371 (c)(1),
(2) Date: Nov. 25, 2019

(87) PCT Pub. No.: WO2018/215150
PCT Pub. Date: Nov. 29, 2018

(65) Prior Publication Data
US 2020/0101893 A1 Apr. 2, 2020

(30) Foreign Application Priority Data
May 24, 2017 (DE) .................... 10 2017 208 837.0

(51) Int. Cl.
*B60Q 1/00* (2006.01)
*B60Q 1/50* (2006.01)
*B60Q 1/26* (2006.01)

(52) U.S. Cl.
CPC ............. *B60Q 1/50* (2013.01); *B60Q 1/0076* (2013.01); *B60Q 1/2607* (2013.01);
(Continued)

(58) Field of Classification Search
CPC ........ H05B 45/00; H05B 45/10; H05B 47/10; B60Q 1/50; B60Q 1/0076; B60Q 1/2607;
(Continued)

(56) References Cited

U.S. PATENT DOCUMENTS 8,547,219 B2 * 10/2013 Kisiel .................... B60Q 1/448
340/468
8,992,057 B2 3/2015 Foley et al.
(Continued)

FOREIGN PATENT DOCUMENTS

AT 512545 A2 9/2013
DE 102009010298 A1 10/2009
(Continued)

*Primary Examiner* — Jimmy T Vu
(74) *Attorney, Agent, or Firm* — Laurence A. Greenberg; Werner H. Stemer; Ralph E. Locher

(57) ABSTRACT

A lighting system for a vehicle and a corresponding motor vehicle is implemented with personalized or individualizable lighting functions. A part of a lighting device is reserved for implementing main lighting functions in accordance with legal requirements and another part of the lighting device is reserved for generating individualizable lighting functions. The part for individualizable lighting functions can be freely programmed and actuated via a user interface, such as a smartphone, within the scope of the technical power limitations of the individual lighting devices while taking into consideration legal requirements.

14 Claims, 4 Drawing Sheets

(52) U.S. Cl.
CPC ...... *B60Q 2400/30* (2013.01); *B60Q 2400/40* (2013.01); *B60Q 2400/50* (2013.01); *B60Q 2900/30* (2013.01)

(58) Field of Classification Search
CPC ............ B60Q 2400/30; B60Q 2400/40; B60Q 2400/50; B60Q 2900/30
See application file for complete search history.

(56) References Cited

U.S. PATENT DOCUMENTS

| | | |
|---|---|---|
| 9,563,010 B2 | 2/2017 | Reinprecht et al. |
| 10,309,608 B2 | 6/2019 | Albou et al. |
| 2014/0268852 A1* | 9/2014 | Foley .................. B60Q 1/0058 362/520 |
| 2017/0106783 A1 | 4/2017 | Fritz et al. |
| 2018/0215309 A1* | 8/2018 | Reinprecht ............ B60Q 1/085 |

FOREIGN PATENT DOCUMENTS

| | | |
|---|---|---|
| DE | 102012214204 A1 | 2/2014 |
| DE | 102014102506 A1 | 12/2014 |
| DE | 102014016334 A1 | 5/2016 |
| DE | 102015012020 A1 | 3/2017 |
| DE | 102015012021 A1 | 3/2017 |
| DE | 102016001420 A1 | 8/2017 |
| EP | 2918446 A1 | 9/2015 |
| EP | 3093192 A1 | 11/2016 |
| WO | 2015090516 A1 | 6/2015 |
| WO | 2016050503 A1 | 4/2016 |
| WO | 2017020056 A1 | 2/2017 |

\* cited by examiner

# INDIVIDUALIZABLE LIGHTING SYSTEM FOR A VEHICLE

BACKGROUND OF THE INVENTION

Field of the Invention

The subject-matter of the present invention is a lighting system for a vehicle and a motor vehicle with such a lighting system.

In the development of modern vehicles it is imperative to satisfy statutory requirements and also customer requirements equally. This is also the case where the development of vehicle illumination is concerned. Statutory requirements as regards vehicle illumination are characterized, in particular, by safety-related considerations. Contrasting with these are the requirements on the customer side, in which, in the case of vehicle illumination, the focus is on design.

In particular, the desire of customers to individualize the vehicle visually on the basis of its illumination is increasingly to be noted. Besides, there is a demand to be able, in addition, to represent vehicle-engineering information individually by utilizing the vehicle illumination. In their aims, statutory requirements and requirements on the part of the customer are in conflict with one another.

In document AT 512 545 A2, for instance, a status indication for the state of an operationally relevant component of a motor vehicle is represented. The status indication includes a luminous structure which, depending on a state of the operationally relevant component, indicates the state of the component in scale-like manner.

DE 10 2009 010 298 A1 presents, moreover, a vehicle headlight. The vehicle headlight includes a luminous band with a plurality of light-sources which can be activated individually in a manner depending on the current speed of the vehicle.

Furthermore, DE 10 2014 016 334 A1 presents an illumination device for an exterior-light function of a motor vehicle. A control device is provided which is able to actuate the illumination device in a manner depending on an operating state of the motor vehicle.

Moreover, EP 2 918 446 A1 describes a system with a vehicle headlight. The vehicle headlight includes a large number of light-sources which can be actuated individually via a control unit in a manner depending on particular driving profiles.

Now it is the object of the present invention to make available a novel lighting system for a vehicle, the flexibility of which as regards its individualizability is enhanced in comparison with known systems.

SUMMARY OF THE INVENTION

The object is achieved by the subject-matters of the independent claims.

A first aspect of the invention relates to a lighting system for a vehicle, comprising:
  a lighting device with a main lighting region;
  a control system which is actively connected to the lighting device; and
  a user interface which is capable of interacting with the control system for the purpose of operating the lighting device.

In accordance with the invention it is specified that the lighting device includes at least one individual lighting region, and individual light functions that can be generated with the individual lighting region are, via the user interface, freely programmable as regards their optical configuration and directly controllable as regards their activation state.

The main lighting region of the lighting device is a region that serves for generating known basic lighting-engineering functions of the vehicle, such as, for instance, daytime running light, low beam, high beam or tail light. The main lighting region, considered in itself, also satisfies all statutory minimum requirements. The individual lighting region, on the other hand, can be actuated directly, separately from the main lighting region. The light functions that can be generated there can be optically integrated into the aforementioned main light functions or can also be generated purely individually. The light functions in the individual lighting region are freely programmable, meaning, in other words, that the full technical functional spectrum of each luminous means provided in the individual lighting region can be accessed. This is possible independently of the luminous means among one another which have been provided, and also independently of the main lighting region. It is readily clear to a person skilled in the art that, here too, statutory regulations have to be borne in mind as limits for the utilization of this functional spectrum. The light functions that can be generated with the individual lighting region can also be actuated directly as regards their activation state, meaning, in other words, that the light functions can be activated or deactivated solely by output of a user signal via the user interface. In particular, it is not necessary that a particular operating state of the vehicle should obtain in order to activate a desired individual light function.

Consequently a lighting device is made available that can be utilized with a maximum of flexibility and consequently with individuality. The light functions of the main lighting region, which are subject to certain compulsory conditions for a great variety of reasons, in particular statutory reasons, are not impaired. By virtue of the direct controllability of the individual lighting region, the lighting system of the invention stands out in positive manner from known systems in which individual light functions are indeed possible but are coupled to the existence of particular operating states of the vehicle. Such light functions are, for instance, functions that are indeed implemented individually but in automatically triggered manner when the vehicle is being opened. For instance, with the lighting system according to the invention it is also possible, by output of the user signal, to cause a vehicle that has been shut down and deactivated to display the freely programmed light function, and to individualize the vehicle in this way.

The individual lighting region includes at least two additional luminous means, but preferentially more than two additional luminous means. The luminous means may be, for instance, LEDs, OLEDs or other luminous means known to a person skilled in the art. The individual lighting region may include, above and beyond this, additional optical elements such as, for example, reflectors, lenses, optical waveguides and diffusing disks. The additional luminous means can be actuated in known manner by, for instance, a bus system of the control system. Of course, it is also technically possible to activate the additional luminous means permanently and to darken them selectively for the purpose of realizing the light functions with additional components that are capable of being switched back and forth, for instance between a translucent state and an opaque state.

In a preferred configuration of the lighting system of the invention it is specified that the control system has been combined with or actively connected to an on-board computer with which the user interface is associated. For instance, the user interface may be present in the form of operating elements of an infotainment system.

This offers the advantage that the programming functions for the light functions of the individual lighting region can be integrated, with little effort and conveniently in terms of operation, into elements of a vehicle that, as a rule, are already present.

In a further preferred or even alternatively preferred configuration of the lighting system of the invention it is specified that a user interface of a mobile terminal which is capable of being actively connected to the control system is made available, and the mobile terminal is equipped at least with control software for direct control of the individual light functions. The mobile terminal may have been actively connected to the control system directly or indirectly. The connection between the control system and the mobile terminal can be established both in hard-wired manner and in wireless manner. The mobile terminal preferably also includes, besides the control software, programming software which preferentially uses a simple operator interface oriented toward an average user, such as an app for instance.

This offers the advantage that the operability of the lighting system is significantly improved as regards comfort and flexibility. In purely exemplary manner, when a vehicle with the lighting system of the invention is being picked up by a person other than the person who shut down the vehicle it is even possible that the person shutting down causes an individual message concerning the lighting system to be sent at a particular time, in a manner activated by remote control, to the person picking up.

In a further preferred configuration of the lighting system of the invention it is specified that the on-board computer and/or the mobile terminal has/have been designed to receive preprogrammed profiles for individual light functions, and to integrate them into the control system.

In this way, profiles for light functions can, for instance, be programmed on a home computer and then transmitted to the control system. In Internet-based manner, profiles for light functions can, for instance, also be downloaded which are then integrated into the control system. Linkages between operating states of the vehicle and the light functions, or even between particular vehicle users and light functions, also definitely enter into consideration as profiles, which, where appropriate, can also be reproduced automatically when particular operating states occur or when the vehicle is being utilized by a particular user. Here too, however, the lighting system of the invention enables an individual programming of the overall conditions that then lead to the automatic control of the light function.

All this further enhances convenience in operation or use of the lighting system of the invention. In this way, it is, for instance, also made possible for users of the lighting system to exchange profiles with one another.

In a further preferred configuration of the lighting system of the invention it is specified that profiles that contain an activation action for particular individual light functions, depending on particular operating states of the vehicle, are programmable via the user interface. Profiles of such a type may have been provided, for instance, in the form of an indication of a state of charge of the vehicle, of a closed state, in the form of coming-home/leaving-home scenarios, in the form of animations, as well as in the form of information displayed into the environment or even representations projected into the environment. The latter may be, for instance, symbols for signaling states of danger. It is, for instance, also possible that a user of the vehicle, after leaving the vehicle, activates a light function manually with which a spacing range from the vehicle that has been shut down, which is to be adhered to, is projected optically into the environment. In this way it is, for instance, possible to signal to other road-users the minimum spacing that is to be adhered to when maneuvering or parking the vehicle that has been shut down.

In a further preferred configuration of the lighting system of the invention it is specified that the mobile terminal is a smartphone or a tablet computer.

Mobile devices of such a type are already widely used, so they can be easily integrated into the lighting system of the invention, for instance by installation of an appropriate program such as an app.

In a further preferred configuration of the lighting system of the invention it is specified that the individual lighting region includes a large number of separate luminous means. The luminous means are preferentially a large number of LEDs which are capable of being actuated individually.

In this way, the individual lighting region can be realized with particularly little effort and with high functional reliability.

In a further preferred configuration of the lighting system of the invention it is specified that the individual lighting region includes a display. Such a display may be, for instance, an LC display (LCD) or an LED display.

A display offers the advantage that it can be employed as a standardized general module or as an additional-purchase module in the lighting system of the invention. This advantageously reduces the assembly effort and offers enhanced functionality with respect to the light functions that are capable of being represented. In the case of high-resolution displays with a great variety of colors capable of being represented, pictures or videos can even be represented in addition to written data.

The individualizability of the light functions that can be generated is significantly enhanced in this way.

In a further preferred configuration of the lighting system of the invention it is specified that the lighting device is a device for exterior vehicle illumination. The lighting system of the invention may preferentially be a headlight, a tail lamp or even a daytime running light. Depending upon the type of vehicle, the lighting devices encompassed by the lighting system according to the invention may, of course, also be present in multiple number. Accordingly it will be understood that, for instance, a motor vehicle may have not only one but also several headlights. The lighting system of the invention is also equally suitable for the realization of interior vehicle illuminations.

A second aspect of the invention relates to a motor vehicle including a lighting system according to the invention, according to the preceding description.

Summarized in other words, the present invention accordingly relates to a lighting system for a vehicle and to a corresponding motor vehicle with which personalized or individualizable light functions can be realized. One part of a lighting device is reserved for the realization of main light functions, in accordance with statutory requirements, and another part of the lighting device is reserved for the generation of individualizable light functions. Within the scope of the technical performance limits of the individual luminous means provided, taking statutory requirements into consideration, the part for individualizable light functions can be freely programmed and actuated via a user interface such as, for instance, a smartphone.

Further preferred configurations of the invention will become apparent from the remaining features mentioned in the dependent claims.

The various embodiments of the invention mentioned in this application can, unless otherwise stated in the individual case, be combined with one another with advantage.

BRIEF DESCRIPTION OF THE SEVERAL VIEWS OF THE DRAWING

The invention will be elucidated in the following in embodiment examples with reference to the associated drawings. Shown are.

DESCRIPTION OF THE INVENTION

Figure 1:
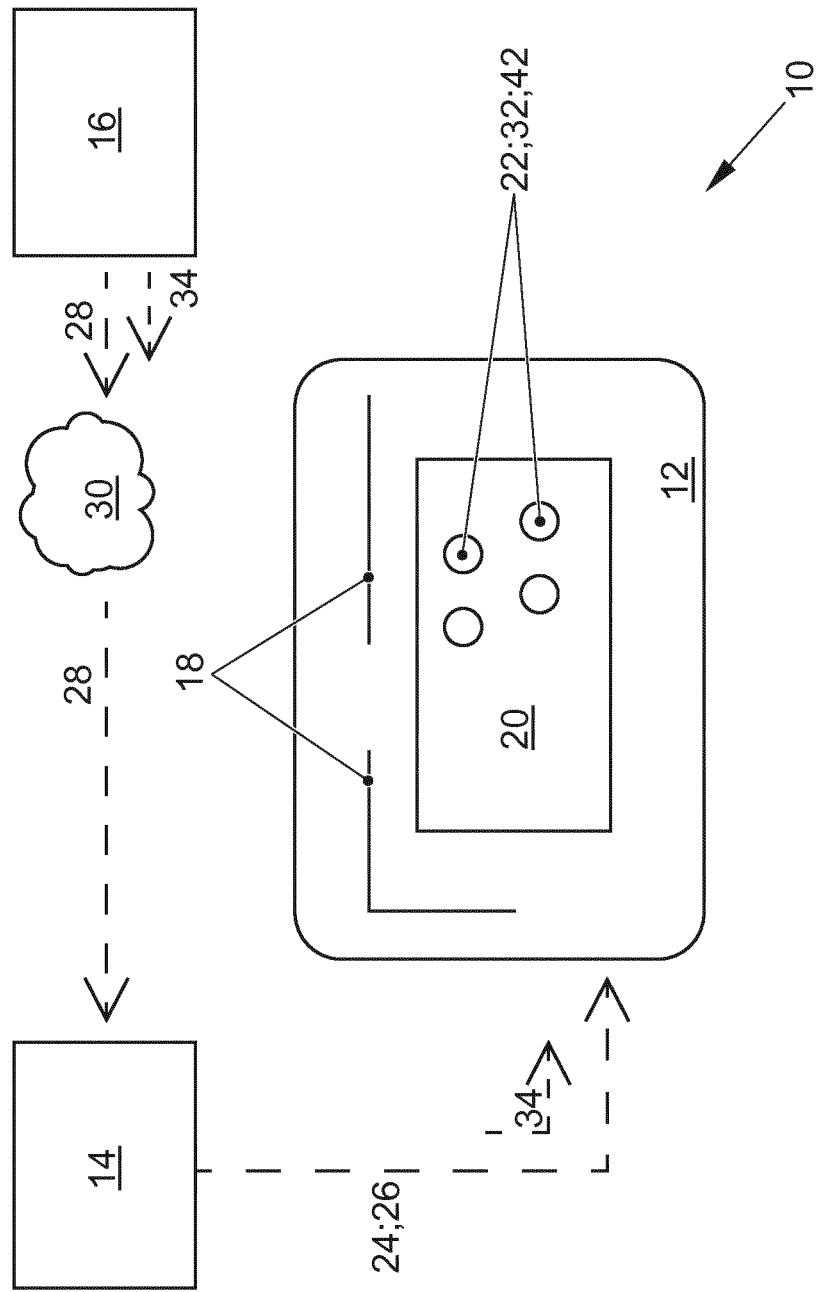
FIG. 1 a block diagram of a lighting system according to the invention.

FIG. 1 shows a block diagram of a lighting system 10 according to the invention for a vehicle. The lighting system 10 comprises a lighting device 12, a control system 14 and a user interface 16. The lighting device 12 is, in turn, subdivided into a main lighting region 18 and an individual lighting region 20.

In the individual lighting region 20, purely by way of example four individual luminous means 22 have been represented. Between the control system 14 and the lighting device 12 an active connection 24 is indicated. The active connection 24 here is a bus system 26 of the control system 14. Furthermore, an active connection 28 between the control system 14 and the user interface 16 is indicated. In the present case this active connection has been designed to be wireless as a radio link over the Internet 30.

Individual light functions 42 that can be generated with the individual luminous means 22 in the individual lighting region 20 are freely programmable as regards their optical configuration. If, purely by way of example, the individual luminous means 22 are LEDs 32, these may for technical reasons have two states each, namely "on" and "off". Accordingly, with the LEDs 32 in the present case 15 individual light functions 42 would be realizable (a deactivated state of all the LEDs 32 not being counted as a light function). If the LEDs 32 are additionally dimmable, the number of individual light functions 42 that can be generated is multiplied by the respective number of dimming states that can be assumed. Within the scope of these technical limits, the individual light functions 42 that can be generated with the LEDs 32 in the individual lighting region 20 are freely programmable via the user interface 16. Similarly, the light functions are directly controllable via the user interface 16. This means that solely by the output of a user signal 34 using the user interface 16 each individual light function 42 achievable with the LEDs 32 can be directly switched on or off.

Figure 2:
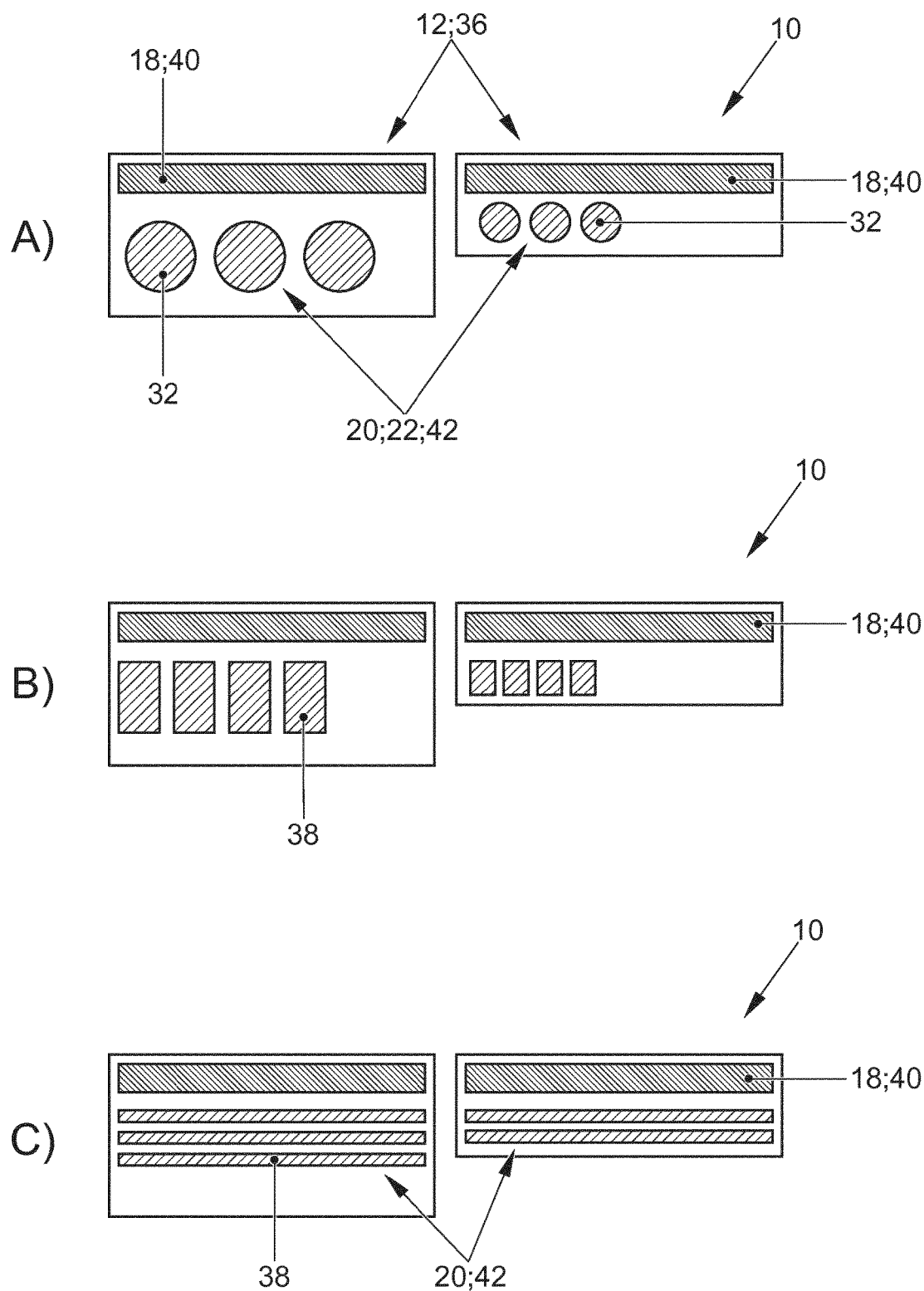
FIG. 2 a lighting device of the lighting system according to the invention with separate luminous means.

FIG. 2 shows, on the basis of an example represented by a two-part tail lamp 36, how the lighting device 12 may have been designed. Three variants—labeled A, B and C—are shown. The remaining elements of the lighting system 10 according to the invention are not represented in FIG. 2. Since in FIG. 2 in each case it is a question of variants of the two-part tail lamp 36, for the sake of clarity not all reference symbols are contained in each view A to C.

In the variants A to C of the tail lamp 36 which are shown, the main lighting region 18 has been realized in conventional manner as an elongated luminous strip. The individual lighting region 20 is constituted by the individual luminous means 22 below the main lighting region 18. In variant A, in each instance three LEDs 32 have been arranged horizontally for this purpose. In variants B and C, additional known optical elements 38 are used in order to generate strip-like regions which, for instance, may have been backlit with LEDs and then have a homogeneous luminous appearance.

Whereas in the main lighting region 18 of the tail lamp 36 basic light functions 40, such as, in this example, a rear light, are generated, in the individual lighting region 20 freely programmable light functions, the individual light functions 42, can be generated. As already presented in the description relating to FIG. 1, these functions are determined only by the technical functional limits of the individual luminous means 22 used in the individual lighting region 20, and can otherwise be configured completely freely. Purely by way of example with respect to variant C, the existing optical elements 38 can be backlit jointly, individually or even with fluid transitions, for instance from left to right.

Figure 3:
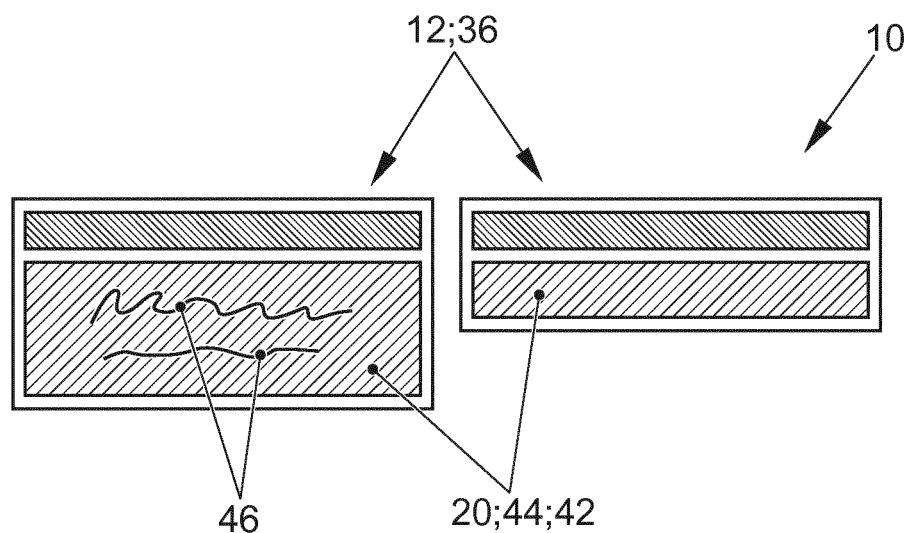
FIG. 3 a lighting device of the lighting system according to the invention with a display.

In contrast to FIG. 2, FIG. 3 shows the tail lamp 36 with a display 44. In this case it is a question, by way of example, of an LC display that for the purpose of generating the individual light functions 42 has been arranged in the individual lighting region 20 or constitutes the latter in the example shown in FIG. 3. With such a display 44, even complex individual light functions 46, for instance, are capable of being represented. For instance, via the user interface 16 (see FIG. 1) a handwritten input can be programmed, for instance via a touchscreen, as a complex individual light function 46 and then displayed in the individual lighting region 20 as a complex individual light function 46 via the control system 14.

Figure 4:
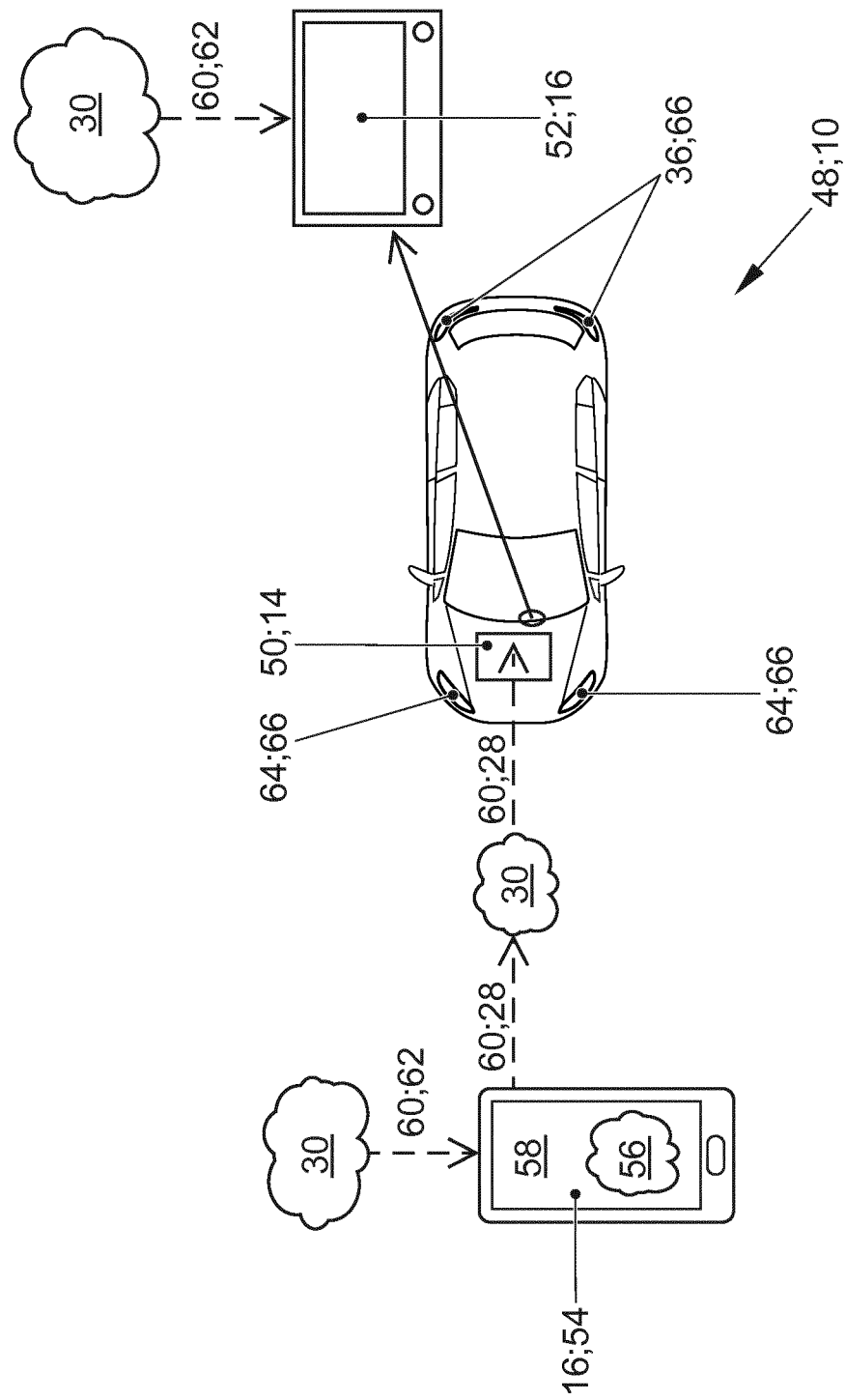
FIG. 4 a motor vehicle according to the invention.

FIG. 4 shows, moreover, a motor vehicle 48 according to the invention with the lighting system 10 according to the invention. The control system 14 of the lighting system 10 here has been integrated into an on-board computer 50 of the motor vehicle 48. The user interface 16 of the lighting system 10 here comprises, on the one hand, operating elements of an infotainment system 52 of the motor vehicle 48 and, on the other hand, a mobile terminal 54, in the present case in the form of a smartphone. The mobile terminal 54 includes programming and control software 56. For instance, an input can be made in handwritten form on a touchscreen 58 of the mobile terminal 54, said input then being converted by the programming and control software 56 into corresponding control data 60 which are then communicated to the control system 14 for the purpose of generating the complex individual light functions 46 from FIG. 3.

In FIG. 4 it is indicated that the on-board computer 50 or also the mobile terminal 54 has been designed also to receive preprogrammed profiles 62 for individual light functions 42, for instance over the Internet 30, and to transmit these profiles to the control system 14 or to integrate them. In the case of the smartphone as user interface 16, this happens in wireless manner over the Internet 30 via the active connection 28. The infotainment system 52, on the other hand, has been built into the motor vehicle 48 and coupled directly with the on-board computer 50.

Arbitrary profiles 62 may also be programmed via the user interface 16 itself. For the purpose of controlling the activation state of the individual light functions 42, these profiles 62 may also contain activation actions pertaining to particular operating states of the motor vehicle 48 for particular individual light functions 42. However, these functions can be chosen freely by the user, so the latter is able to stipulate which operating state is to be a criterion for controlling an individual light function 42.

In the present FIG. 4, the lighting system 10 according to the invention has been provided by way of example for the purpose of realizing a tail lamp 36 and a headlight 64. In both cases it is accordingly a question of an exterior vehicle illumination 66. However, the lighting system 10 according to the invention is equally suitable for application in the passenger compartment of the vehicle.

LIST OF REFERENCE SYMBOLS

10 lighting system
12 lighting device
14 control system
16 user interface
18 main lighting region
20 individual lighting region
22 individual luminous means
24 active connection
26 bus system
28 active connection
30 Internet
32 LEDs
34 user signal
36 tail lamp
38 optical elements
40 basic light functions
42 individual light functions
44 display
46 complex individual light functions
48 motor vehicle
50 on-board computer
52 operating elements of an infotainment system
54 mobile terminal
56 programming and control software
58 touchscreen
60 control data
62 profiles
64 headlight
66 exterior vehicle illumination

The invention claimed is:

1. A lighting system for a vehicle, the lighting system comprising:
  a lighting device formed with a main lighting region and an individual lighting region, said individual lighting region being offset from said main lighting region in a direction transverse to an illumination direction of said main lighting region and being separate therefrom without an overlap between said main lighting region and said individual lighting region;
  a control system actively connected to said lighting device; and
  a user interface configured for interacting with said control system for operating said lighting device;
  said individual lighting region being configured to generate individual light functions that are freely programmable via said user interface with regard to an optical configuration thereof and that are directly controllable with regard to an activation state thereof.

2. The lighting system according to claim 1, wherein said control system is combined with, or actively connected to, an on-board computer that is operatively associated with said user interface.

3. The lighting system according to claim 1, which further comprises a user interface provided by a mobile terminal and enabled for active connection to said control system, and wherein the mobile terminal is equipped with control software for direct control of the individual light functions.

4. The lighting system according to claim 3, wherein the mobile terminal is configured to receive preprogrammed profiles for individual light functions and to integrate the profiles into said control system.

5. The lighting system according to claim 2, wherein the on-board computer is configured to receive preprogrammed profiles for individual light functions and to integrate the profiles into said control system.

6. The lighting system according to claim 1, wherein profiles are programmable via said user interface that contain an activation action for particular individual light functions, depending on particular operating states of the vehicle.

7. The lighting system according to claim 3, wherein the mobile terminal is a smartphone or a tablet computer.

8. The lighting system according to claim 1, wherein said individual lighting region contains a multiplicity of separate luminous devices.

9. The lighting system according to claim 1, wherein said individual lighting region includes a display mounted adjacent said main lighting region.

10. The lighting system according to claim 1, configured as a lighting device for exterior vehicle illumination.

11. A motor vehicle, comprising a lighting system according to claim 1.

12. A lighting system for a vehicle, the lighting system comprising:
  a lighting device formed with a main lighting region configured to perform basic light functions related to an operation of the vehicle, and a display screen adjacent said main lighting region and configured to emit freely programmable light functions, said display screen being an LCD or an LED display;
  a control system actively connected to said lighting device; and
  a user interface configured for interacting with said control system for operating said lighting device;
  said display screen being configured to generate individual light functions that are freely programmable via said user interface with regard to an optical configuration thereof and that are directly controllable with regard to an activation state thereof.

13. The lighting system according to claim 12, wherein said lighting device is a brakelight assembly of the vehicle.

14. The lighting system according to claim 12, wherein said lighting device is a headlight assembly of the vehicle.

* * * * *